Patented Sept. 24, 1946

2,408,139

UNITED STATES PATENT OFFICE 2,408,139

DEHYDROGENATION PROCESS

Carlos L. Gutzeit, Terre Haute, Ind., assignor to Shell Development Company, a corporation of Delaware No Drawing. Application March 6, 1944,
Serial No. 525,299

7 Claims. (Cl. 260—680)

This invention relates to a new and improved process for effecting dehydrogenations of a certain type and to new and improved catalysts therefor. More particularly the invention relates to a process for the production of diolefins by catalytic dehydrogenation characterized by the use of special catalysts under special conditions. A particular aspect of the invention relates to a process for the production of butadiene by the catalytic dehydrogenation of normal butylenes.

An object of the invention is to provide a process whereby the dehydrogenation of mono-olefins to the corresponding diolefins and certain other related dehydrogenation processes, for instance the dehydrogenation of ethyl benzene to styrene, may be more economically carried out with good conversions and excellent efficiency at ordinary or moderate pressures. Another object of the invention is to provide new and improved catalysts which are particularly suited for effecting dehydrogenation reactions of the described type at elevated temperatures in the presence of steam. Another object is to provide a process of the described type which may be carried out substantially continuously.

In the preferred embodiment of the invention suitable mono-olefins are converted more or less selectively in good yields to the corresponding diolefins by catalytic dehydrogenation at temperatures above about 580° C. in the presence of at least two mols of steam per mol of mono-olefin with special alkalized iron oxide and/or cobalt oxide catalysts containing minor concentrations of bismuth oxide. The iron oxide and/or cobalt oxide in the catalysts is in molecular excess with respect to the total of any additional constituents of the catalyst which react with the iron oxide and/or cobalt oxide under the process conditions.

The process of the invention is particularly advantageous for the production of butadiene by catalytic dehydrogenation of normal butylenes such, for instance, as the various commercial butylene fractions consisting essentially of butene-1 and/or butene-2. It is, however, also applicable and advantageous for the production of other diolefins and particularly conjugated diolefins, such as piperylene, isoprene, the various hexadienes, etc., from the corresponding mono-olefins. Thus, the process may generally be applied for the production of diolefins from the corresponding mono-olefins having at least four non-quaternary carbon atoms in a straight chain. The process of the invention involves the treatment of the olefins in the vapor phase at temperatures above about 580° C. In order to produce the corresponding diolefins more or less selectively, the olefins treated are therefore those which may be heated to temperatures above about 580° C. without substantial decomposition. Since the tendency for the various olefins to undergo thermal cracking increases with their molecular weights, preferred olefins to be treated are the lower olefins having from 4 to about 6 non-quaternary carbon atoms in a straight chain. The olefin to be dehydrogenated may be a single hydrocarbon or, if desired, a mixture of olefins may be dehydrogenated to produce a mixture of diolefins. Also, in some cases a single diolefin may be produced from a mixture of isomeric olefins. For example, butadiene may be produced from either butene-1 or butene-2 or a mixture of the two, and isoprene may be produced from methyl ethyl ethylene, trimethyl ethylene, or isopropyl ethylene, or a mixture of these olefins.

In order to facilitate the recovery of the diolefin and unconverted mono-olefin from the product and for various other practical reasons, it is usually desirable that the feed consist essentially of the desired olefin or mixture of olefins. This is, however, not essential and in some cases it may be more advantageous to use olefin fractions comprising appreciable amounts of relatively inert diluents. Thus, for example, in the production of butadiene, a so-called butane-butylene fraction containing substantial amounts of butane may be used. The paraffin hydrocarbons are substantially unaffected in the process of the invention and may be considered as inert diluents. In this respect the process of the invention differs fundamentally from most of the known dehydrogenation processes which are much more suited for the dehydrogenation of paraffins than for the dehydrogenation of olefins and are totally incapable of selectively dehydrogenating olefins in the presence of paraffins.

The dehydrogenation of olefins to the corresponding diolefins differs from most other dehydrogenation processes in requiring a low partial pressure of reactants in the reaction zone. Thus, in all known processes for the production of diolefins by dehydrogenation, it is necessary either to carry out the dehydrogenation under a substantial vacuum or to employ large quantities of a diluent. Operation under diminished pressure is very costly. The use of inert diluents to decrease the partial pressure of the reactants usually makes the efficient separation and recovery of the diolefin from the product very difficult and this is a serious disadvantage. Steam is an ideal diluent but, unfortunately, many of the most active dehydrogenation catalysts are not suited for use in the presence of steam. Also, most of the known catalysts are not sufficiently selective in their action and, if steam is used as a diluent, they catalyze the oxidation of the reactants by the steam, thus giving low yields.

The above-described olefins are dehydrogenated, according to the process of the invention, in the presence of a substantial mol excess of steam with special catalysts which are designed to selectively dehydrogenate olefins in the presence of steam over long periods of time with relatively infrequent regeneration. In the process of the invention the use of steam is not merely permissible; the steam besides being an ideal diluent has other important functions and is essential. Thus, in the present process the material to be dehydrogenated is contacted with the catalyst in the presence of at least two and preferably at least seven mol proportions of steam. In the dehydrogenation of butylene to butadiene, for example, the best results have been obtained when using from about 7 to 30 mols of steam per mol of butylene.

In order to use the above-specified concentrations of steam advantageously, it is necessary that the process be carried out at relatively high temperatures. Thus, the dehydrogenation is carried out in the present process at a temperature above about 580° C. and more generally at a temperature between about 600° C. and 700° C. Somewhat higher temperatures may be used but are generally unnecessary.

The above-specified olefins are dehydrogenated according to the process of the invention by contacting them under the conditions set forth with special catalysts consisting essentially of alkalized iron oxide provided with minor concentrations of bismuth oxide. Cobalt oxide is somewhat more active than iron oxide and may be substituted for part or all of the iron oxide. However, in view of the relatively high cost of cobalt oxide, its practical application is probably limited to use in minor concentrations. In the following the catalysts are referred to as iron oxide catalysts with the understanding that the iron oxide may, if desired, be substituted in part by its equivalent, cobalt oxide.

It appears that the state of oxidation and also possibly the state of hydration of the iron oxide are important in determining the activity of the catalyst. The exact states of oxidation and hydration of the iron oxide during use of the catalyst are not known. It appears, however, that the maximum activity and selectivity of the catalyst for these particular reactions are obtained when the iron oxide is in an intermediate state of oxidation between ferrous oxide and ferrosoferric oxide, and is slightly hydrated. The desired states of oxidation and hydration, whatever they may be, are established and maintained by the particular combinations and concentrations of bismuth oxide and alkalis and the particular reaction conditions. Consequently, the catalysts of the invention may be prepared from iron oxide derived from a variety of sources. Suitable iron oxides may be prepared, for instance, by the thermal decomposition of iron compounds such as ferric nitrate, ferric acetate, ferrous oxalate, ferric ammonium oxalate, etc. Also, very suitable iron oxides may be produced in the wet way by precipitation of the hydrous oxides from solutions of iron salts such as ferric nitrate, ferric sulfate and the like, followed by dehydration. Iron oxide produced as a by-product in the production of alumina, for instance, is suitable. Suitable iron oxide may also be produced from certain iron ores such, for instance, as high grade hematite. These ores per se generally give relatively poor catalysts. They may be made suitable, however, by grinding them and retorting with ammonium sulfate. The ammonium sulfate may be recovered and reused.

The iron oxide is used in intimate association with minor concentrations of bismuth oxide. Bismuth oxide, when in intimate association with iron oxide, it appears, prevents the reduction to below a given oxidation state which is dependent upon the composition of the reactant feed, the temperature in the reaction zone, and the effective concentration of bismuth oxide. The effective concentration of bismuth oxide is a function of the actual concentration and the intimacy of contact with the iron oxide. By the use of suitable effective concentrations of bismuth oxide the desired most active state of oxidation of the iron oxide is stabilized and excessive reduction of the iron oxide with its consequent catalyzation of the formation of large amounts of carbon is prevented. In order to establish, stabilize and maintain the desired state of oxidation of the iron oxide under the specified conditions, concentrations of bismuth oxide of between about 1 and 40 mol per cent (calculated as $Bi_2O_3$) and preferably between about 2 and 25 mol per cent (the balance being iron oxide calculated as $Fe_2O_3$) are indicated.

The iron oxide and bismuth oxide may be brought into a suitable intimate association in a variety of ways. For instance, a mixture of iron and bismuth salts, for instance the nitrates, may be thermally decomposed and the powdered mixture pelleted; or the hydrous oxides of iron and bismuth may be mixed and the mixture partly dried and pilled or extruded; or an iron oxide sol may be mixed with bismuth oxide or may be impregnated with a suitable bismuth salt decomposable to the oxide by heating.

In the catalyst of the invention it is essential that the iron oxide be alkalized with a small amount of an alkali. Compounds of the alkali metals (Li, Na, K, Rb, Cs) are suitable. Of these, the compounds of potassium are preferred. The alkaline earth metals (Ca, Sr and Ba) and copper and silver also exert a similar effect and their compounds may be used in place of part of the alkali metal compounds. The alkali or mixture of alkalis may be incorporated into the catalyst in the form of various compounds such as the nitrate, hydroxide, acetate, sulfate, carbonate and the like. These compounds are probably decomposed or reduced in part to the oxides during the preparation and/or use of the catalyst.

The concentration of alkali, calculated as the oxide, should be at least 0.2 mol per cent based on the iron and bismuth oxides (calculated as $R_2O_3$) and is preferably somewhat higher, for instance between about 0.5 mol per cent and 5 mol percent. The alkali may be incorporated into the catalyst at any convenient stage of the preparation. In such case, however, where the catalyst is formed into particles of a desired size by pilling, extruding or the like, the alkali is preferably incorporated prior to the forming operation. During extended use of the catalyst the alkali used, particularly if it is potassium, may be partly lost from the catalyst by volatilization and this may cause a decline in the activity of the catalyst. If this happens, the activity of the catalyst may be restored by simply adding additional alkali, for instance by impregnation, or by adding a small amount of potassium carbonate with the steam.

The inclusion of minor amounts of additional agents in the catalyst is not precluded. For example, a small amount of barium oxide or copper oxide appears to exert an additional effect and may be present. However, the major active constituent should be the described alkalized iron oxide-bismuth oxide and any components which are capable of reacting with the iron oxide under the process conditions, for instance to form a spinel, if present at all, are present in minor mol amounts with respect to the iron oxide. For this reason, such materials as alumina, magnesia etc., if present at all, are present in minor concentrations and cannot be used as supports, carriers or diluents.

As is known, most catalysts are deactiviated or severely damaged if subjected to fairly high temperatures. The loss of catalytic activity may be due to several factors but is usually due to loss of available catalytic surface caused by sintering and recrystallization, or to change of the catalyst constituents into inactive forms, or to chemical interaction of the catalyst constituents with one another to form inactive materials. Few catalysts are capable of retaining their activity when subjected to temperatures above about 700° C. For this reason it is the practice to avoid subjecting catalysts to temperatures above those absolutely necessary. The catalysts used in the process of the invention are very rugged and are capable of withstanding temperatures in excess of 800° C. without any loss of activity. Furthermore, it is found that they are often materially improved by subjecting them to a drastic heat treatment. This treatment is beneficial in all cases but is particularly beneficial when applied to catalysts which initially have a relatively large available surface, for instance above about 30 square meters per gram. Thus, it is particularly beneficial when applied to catalysts prepared from precipitated iron hydroxide. The heat treatment apparently destroys certain extra-fine pores in the catalyst and thereby decreases the available surface. Thus, although it is not essential, it is usually desirable to calcine the catalyst prior to use to reduce the available surface to below about 30 square meters per gram. The calcination may be carried out at temperatures of from about 700° C. to about 1000° C., for instance 750° C. to 900° C. In some cases the beneficial effect may be obtained with only a short heat treatment; the time of calcination is, however, not critical and rather long calcinations, for instance 24 hours, may be employed without damage to the catalyst.

The catalyst may be used in any of the conventional forms such as powder, pills, spheres, saddles, extrudates or irregular fragments of a shape and size adapted for the reaction system to be used. These catalysts, it is found, are usually sensitive to changes in the particle size. Thus, their effectiveness increases markedly with decrease in size of the catalyst particles. For this reason it is desirable to use the catalyst in the smallest size consistent with the allowable pressure drop in the converter.

The above-described catalysts are exceptionally rugged and may be heated to temperatures up to about 900° C. to 1000° C. in the presence of steam without loss of efficiency. They are particularly adapted for use at high temperatures in the presence of steam, and, as pointed out, steam is essential for their use. If, during use, they become relatively inefficient due to lack of sufficient steam, they may be restored to essentially their original activity by simply steaming them for a few hours, preferably at a temperature between about 600° C. and 800° C.

The process of the invention may be carried out in a so-called dust catalyst, fluidized catalyst, or moving bed system. In these systems the dehydrogenation may be carried out continuously in one reactor and if desired the catalyst may be continuously treated to retain its effectiveness in a second reactor. The process can, however, also be carried out substantially continuously when simply passing the reactant vapors and steam through a fixed bed of the catalyst provided in a suitable converter, catalyst case, or elongated reaction tube maintained at the desired temperature. For the purpose of the present specification an operation in which the conversion and conversion efficiency remain with no appreciable drop for a period of continuous operation of at least 10 hours under a fixed set of conditions is considered to be an essentially continuous operation. Conversion is herein defined as the percent of the reactant applied which undergoes reaction and is converted into a different product. Conversion efficiency is defined as the percent of the material converted or reacted which is converted to the desired product—in this case, diolefins having the same number of carbon atoms as the parent material. The conversion and conversion efficiency are interdependent, the conversion efficiency becoming lower as the conversion is increased. The optimum conversion and conversion efficiency for any given operation, therefore, depend upon the particular economic factors. In the production of butadiene by the present process, by way of example, conversions of about 25–30% are considered at present to be quite suitable.

In the production of diolefins according to the process of the invention, the contact time of the olefin with the catalyst affording the optimum results depends upon the particular olefin or mixture of olefins being dehydrogenated and the particular conditions chosen, and may best be determined for any given case by starting with a very short contact time and then gradually increasing the contact time until the desired conversion and conversion efficiency are obtained. Suitable contact times for the dehydrogenation of butylenes to butadiene, by way of example, are of the order of 0.02 to 0.5 second. Since the true contact time is difficult to determine accurately, it is desirable to speak in terms of gaseous hourly space velocity (G. H. S. V.) which is defined as the volumes of reactant gas (N. T. P.) contacted with a unit volume of catalyst bed per hour. The process of the invention allows excellent conversions to diolefins to be obtained quite selectively over a considerable range of suitable space velocities. Applicable gaseous hourly space velocities are, for example, between about 300 and 3000.

The process may be carried out under partial vacuum or under superatmospheric pressures. One of the advantages of the process is, however, that neither vacuum nor high pressures are required and that excellent results may be obtained while working at atmospheric pressure or very moderate pressures, for instance pressures of from 1 to 3 atmospheres.

Example I

A catalyst consisting of an essentially homogeneous mixture of iron oxide and bismuth oxide (mole ratio of Fe to Bi=80:20) alkalized with 0.5 mole per cent of potassium nitrate was prepared as follows: The hydrous oxides of iron and bismuth were co-precipitated from a solution of ferric sulfate and bismuth nitrate (containing 3 moles of nitric acid per mole of bismuth nitrate) with ammonium hydroxide at a final pH of about 8.5. The co-precipitated hydrous oxide mixture was filtered, washed, and then mixed with the required amount of potassium nitrate. The mixture was then dried at about 110° C. and finally calcined at 750° C. for 6 hours.

This catalyst after pretreating for 1 hour with a mixture of steam and hydrogen at 600° C. was used for the continuous production of butadiene by catalytic dehydrogenation of a typical normal butylene fraction consisting essentially of butene-1 and butene-2. The butylene was vaporized and preheated and passed in admixture with steam through a stationary bed of the catalyst. The dehydrogenation conditions were as follows:

Temperature _____ About 625° C.
Butylene gaseous hourly space velocity _____ About 500
Steam gaseous hourly space velocity _ About 7000
Pressure (at exit) __ About 1 atmosphere absolute The operation was carried out continuously. The conversion of normal butylene to butadiene increased during the first 12 hours of operation to about 25% and showed no signs of decline. The amount of butylene reacted was about 33% of the butylene applied. The conversion efficiency was therefore about 75%.

Example II

A catalyst consisting of an essentially homogeneous mixture of iron oxide and bismuth oxide (mole ratio of Fe to Bi=99:1) alkalized with 0.5 mole per cent of potassium nitrate was prepared as follows: The hydrous oxides of iron and bismuth were co-precipitated from a solution of ferric sulfate and bismuth nitrate (containing 3 moles of nitric acid per mole of bismuth nitrate) with ammonium hydroxide at a final pH of about 8.5. The co-precipitated hydrous oxide mixture was filtered, washed, and then mixed with the required amount of potassium nitrate. The mixture was then dried at about 110° C. and finally calcined at 750° C. for 6 hours.

This catalyst after pretreating for 1 hour with a mixture of steam and hydrogen at 600° C. was used for the continuous production of butadiene by catalytic dehydrogenation of a typical normal butylene fraction consisting essentially of butene-1 and butene-2. The butylene was vaporized and preheated and passed in admixture with steam through a stationary bed of the catalyst. The dehydrogenation conditions were as follows:

Temperature _____ About 625° C.
Butylene gaseous hourly space velocity _____ About 500
Steam gaseous hourly space velocity _ About 7000
Pressure (at exit) __ About 1 atmosphere absolute The operation was carried out continuously. The catalyst did not show any noticeable induction period. The conversion of butylene to butadiene remained substantially constant at about 22%. The conversion efficiency was about 75%.

In the above I have described and illustrated a very practical process for the production of diolefins from the corresponding mono-olefins by dehydrogenation. The dehydrogenation of olefins to the corresponding diolefins differs fundamentally from most other dehydrogenation processes. This is evident from the conditions required. Thus, dehydrogenation of mono-olefins to diolefins requires a low partial pressure of reactants in the reaction zone, requires very high temperatures, and requires very short contact times. These drastic and unusual dehydrogenation conditions are perhaps necessitated partly by the great polymerizing tendency of the product. Since the process of the invention is particularly designed to selectively dehydrogenate mono-olefins to diolefins under these special conditions, it cannot be expected to be advantageous or even applicable for other types of dehydrogenation reactions. An exception is, however, the production of styrene and its homologues by the dehydrogenation of the corresponding alkyl aromatic hydrocarbons. This dehydrogenation can be advantageously carried out under the conditions specified for the production of diolefins.

I claim as my invention:

1. A process for the continuous production of butadiene from normal butylene by dehydrogenation which comprises continuously contacting a normal butylene in the presence of at least two mols of steam per mol of butylene at a temperature above about 580° C. and at a gaseous hourly space velocity between about 300 and 3000 with a dehydrogenation catalyst consisting essentially of an essentially homogeneous mixture of iron oxide and bismuth oxide and potassium oxide containing said iron oxide as the major constituent and from 1 to 40 mol percent of bismuth oxide and from 0.2 to 5 mol percent of potassium oxide.

2. A process for the continuous production of butadiene from normal butylene by dehydrogenation which comprises continuously contacting a stream of a normal butylene in the presence of from 7 to 30 mols of steam per mol of butylene at a temperature above about 580° C. and at a gaseous hourly space velocity between about 300 and 3000 with a dehydrogenation catalyst consisting essentially of an essentially homogeneous mixture of iron oxide, bismuth oxide and potassium oxide, containing said iron oxide as the major constituent and from 1 to 40 mol percent of bismuth oxide and from 0.2 to 5 mol percent of potassium oxide.

3. A process for the continuous production of butadiene from normal butylene by dehydrogenation which comprises continuously contacting a normal butylene in the presence of at least two mols of steam per mol of butylene at a temperature above about 580° C. and at a gaseous hourly space velocity between about 300 and 3000 with a dehydrogenation catalyst consisting essentially of an essentially homogeneous mixture of iron oxide, bismuth oxide and potassium oxide, containing said iron oxide as the major constituent, a minor amount of an alkaline compound of potassium and from 2 to 25 mol percent of bismuth oxide.

4. A process for the continuous production of butadiene from normal butylene by dehydrogenation which comprises continuously contacting a normal butylene in the presence of at least two mols of steam per mol of butylene at a temperature above about 580° C. and at a gaseous hourly space velocity between about 300 and 3000 with a dehydrogenation catalyst consisting essentially of an alkalized essentially homogeneous mixture of iron oxide and bismuth oxide, containing said iron oxide as the major constituent and from 1 to 40 mol percent of bismuth oxide.

5. A process for the continuous production of a diolefin from the corresponding mono-olefin by catalytic dehydrogenation which comprises continuously contacting a mono-olefin having at least four non-quaternary carbon atoms in a straight chain in the presence of at least two mols of steam per mol of mono-olefin at a temperature above about 580° C. and at a gaseous hourly space velocity between about 300 and 3000 with a dehydrogenation catalyst consisting essentially of an essentially homogeneous mixture of iron oxide, bismuth oxide and potassium oxide, containing said iron oxide as the major constituent and from 1 to 40 mol percent of bismuth oxide and from 0.2 to 5 mol percent of potassium oxide.

6. A process for the continuous production of a diolefin from the corresponding mono-olefin by catalytic dehydrogenation which comprises continuously contacting a mono-olefin having at least four non-quaternary carbon atoms in a straight chain in the presence of at least two mols of steam per mol of mono-olefin at a temperature above about 580° C. and at a gaseous hourly space velocity between about 300 and 3000 with a dehydrogenation catalyst consisting essentially of an essentially homogeneous mixture of iron oxide, bismuth oxide and potassium oxide, containing said iron oxide as the major constituent, a minor amount of potassium oxide and from 2 to 25 mol percent of bismuth oxide.

7. A process for the continuous production of a diolefin from the corresponding mono-olefin by catalytic dehydrogenation which comprises continuously contacting a mono-olefin having at least four non-quaternary carbon atoms in a straight chain in the presence of at least two mols of steam per mol of mono-olefin at a temperature above about 580° C. and at a gaseous hourly space velocity between about 300 and 3000 with a dehydrogenation catalyst consisting essentially of an alkalized essentially homogeneous mixture of iron oxide and bismuth oxide containing said iron oxide as the major constituent and from 1 to 40 mol percent of bismuth oxide.

CARLOS L. GUTZEIT.